Feb. 6, 1968   M. FROELICH   3,367,409

LIQUID STERILIZATION TREATMENT PLANT

Filed Jan. 3, 1966   2 Sheets-Sheet 1

Inventor:
MARTIN FROELICH
BY
Kenyon & Kenyon
ATTORNEYS

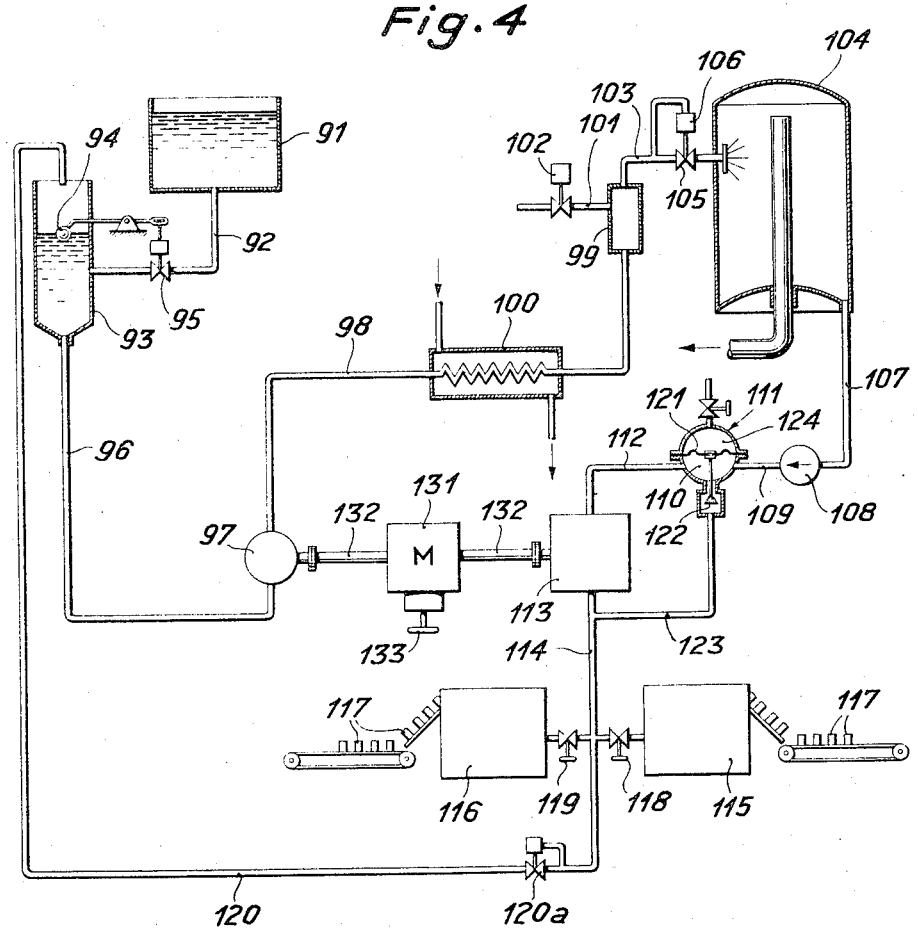

United States Patent Office 3,367,409
Patented Feb. 6, 1968

3,367,409
LIQUID STERILIZATION TREATMENT PLANT
Martin Froelich, Konolfingen, Bern, Switzerland, assignor to Sulzer Brothers, Limited, Winterthur, Switzerland, a corporation of Switzerland
Filed Jan. 3, 1966, Ser. No. 518,042
Claims priority, application Switzerland, Jan. 15, 1965, 574/65
9 Claims. (Cl. 165—40)

ABSTRACT OF THE DISCLOSURE

The flow of liquid in the sterilization plant is regulated in relation to the output flow demand of the racking stations. The output of the homogenization pump is controlled by a flow sensing device in the flow line which regulates the flow of liquid from the pump so as to provide a constant flow to the racking stations.

---

The invention relates to a liquid sterilization treatment plant. More particularly, the invention relates to a liquid sterilization treatment plant wherein the output flow of liquid is controlled in relation to the internal flow of liquid.

Liquid sterilization treatment plants generally place a liquid under pressure, conduct the pressurized liquid into contact with steam and thereafter cool the liquid by reducing the pressure.

Plants of this type allow non-injurious sterilization within a short heating time. It is known that the required sterilization temperatures depend on the duration of the heating time. For example, in the treatment of milk, the sterilization temperature is about 150° C. with a heating time of 1 to 2 seconds for full sterilization without the milk undergoing any harmful changes in its constituents or taste. Other liquids, such as, liquid foods, beverages, pharmaceutical adjuvants, can be likewise treated.

Liquids treated in this way can be kept for a relatively long period; milk, for example, can be stored for several weeks at room temperatures provided that no re-infection occurs. The product must of course be packed in sterile containers under sterile conditions; packing in pre-sterilized paper containers under aseptic conditions is very suitable.

A sterilization plant of this type can supply one or more racking machines with sterilized liquid. Since such racking machines generally operate with a constant output, the flow of liquid through the sterilization plant must be accurately adjusted to the output of a racking machine or be adjustable to different outputs depending upon how many operative racking stations are fed from a common sterilization plant. The procedure heretofore was to detect the flow of liquid through the plant by means of a suitable sensing element after expansion, for example, by means of a sensing element responding to the level of liquid in a level tube, a signal produced by the sensing element then being fed to a controller enabling the amount of liquid fed into the plant per unit of time to be controlled.

Systems of this type have serious disadvantages. First, if the liquid for sterilization is sprayed into an expansion chamber, there is no constrained path for the liquid through the plant. Because of this and because of the relatively long liquid path between the sensing element and the setting element on the entry side of the plant there is an undesirable inertia in the response of the sensing element and in the correction of the liquid flow. This results in hunting which makes it difficult to maintain the heating temperature with a very close tolerance. In the event of fluctuations in the heating temperature, the treated liquid will not be sterilized if the temperature drops below the required value, while if it exceeds the required value any sensitive constituents of the liquid will readily be harmed.

A second disadvantage is that the liquid leaving the expansion chamber depends not only on the amount of liquid introduced into the plant but also on the pressure conditions at any time. If the disturbing factors also result in variations in the expansion pressure, a larger or smaller proportion of water will evaporate during expansion and this will vary the amount of liquid fed to the sensing element and produce a control signal which no longer corresponds at all to the total flow conditions.

Accordingly, it is an object of the invention to provide a liquid sterilization treatment plant which maintains the flow of liquid at a constant relationship with a sterilization temperature source.

It is another object of the invention to provide a liquid sterilization treatment plant which maintains the flow of liquid at a constant expansion pressure.

It is another object of the invention to provide a liquid sterilization treatment plant which maintains the flow of liquid in relation to the liquid requirements of a racking station connected therewith.

It is another object of the invention to provide a liquid sterilization treatment plant which regulates the liquid output in relation to the internal flow of liquid.

Generally, the treatment plant has a pipe means for conducting a flow of liquid from a suitable supply source through a heating system which injects steam into the fluid in the pipe means at an intermediate point in order to heat the fluid. Thereafter, the heated fluid is conducted into a pressure reduction means at the end of the pipe means so that the liquid will be cooled upon reduction of the pressure. A liquid path means is connected to the pressure reduction means to conduct the cooled liquid to a driven volumetric delivery device from which it is then delivered to a racking station having one or more racking machines for packaging the fluid. A sensing means is interposed in the liquid path means to sense the flow of liquid therein and to regulate the drive of the volumetric delivery device in response to the amount of flow in the liquid path means. In addition, an adjustable flow setting device is interposed in the pipe means upstream of the heating system for adjusting the flow of liquid into the pipe means at a fixed value in relation to the capacity of the racking station, that is, in dependence on the number of racking machines in operation.

The amount of liquid flowing into the actual heating system per unit of time can be adjusted to the racking station capacity by means of the flow setting device. Thereafter, any minor fluctuations which are inevitable in operation, or any change over the flow setting device to twice or three times the liquid flow are automatically detected by the sensing means disposed after the pressure reduction chamber in the liquid path, and a sensing means signal can then be sent out to regulate the output of a volumetric delivery device.

Conveniently, the liquid path between the pressure reduction means, for example, an expansion chamber, and the volumetric delivery device contains a centrifugal pump which acts as a feed pump, and the flow cross-section of the pipe connecting the expansion chamber to the centrifugal pump is so dimensioned that even with the maximum expected flow the pipe is not filled throughout the entire cross-section. Advantageously, the sensing means can be formed by a flexible diaphragm which is deflected if the delivery of the centrifugal pump exceeds the flow of liquid from the volumetric delivery device, the amount of deflection determining the magnitude of the signal to the delivery device.

It is also advisable for the volumetric delivery device to have a variable speed drive, the signal delivered by the sensing means controlling the speed of the volumetric delivery device so that in the event of an increase in the amount of liquid flow the speed is increased, and vice versa. In another embodiment of the invention, the variable speed feature described may be dispensed with and a bypass pipe with a flow control element can branch from the outlet pipe of the volumetric delivery device, a quantity of liquid being branched through the bypass pipe at full-load and being returned preferably to the entry side of the volumetric delivery device. In such conditions the signal produced by the sensing means actuates a flow control valve so that it performs a closing movement in the event of an increase in the amount of liquid flowing through the plant, and vice versa. Finally, a level tube may be provided in the flow path between the expansion chamber and the volumetric delivery device, the sensing means in this case delivering a signal which is dependent upon the level of liquid in the level tube.

Advantageously, a recycle pipe can be connected to the connecting pipe between the volumetric delivery device and a racking station fed by the treatment plant, through which recycle pipe a quantity of liquid can be returned to the entry side of the flow setting device.

In a very advantageous embodiment of the invention, the flow setting device is in the form of a volumetric feed pump and is coupled to the volumetric delivery device through the variable drive means in respect of speed. The effect of this is that the relationship between the amount of liquid flowing in the plant and the amounts of liquid flowing from the plant to the racking and packing stations obeys a specific law under all conditions of operation, and any harmful hunting is practically eliminated. With the above embodiment it is also advantageous to provide the variable drive means with a means for common adjustment of the speeds of the feed pump and delivery device.

The invention and other advantages and features thereof are explained in detail hereinafter with reference to the exemplified embodiments illustrated in the drawings, wherein:

FIG. 1 diagrammatically illustrates a sterilization treatment plant with an apparatus according to the invention for controlling the flow of liquid therethrough in conjunction with a homogenization pump as a volumetric delivery device having a variable speed drive.

FIG. 4 diagrammatically illustrates a sterilization treatment plant with a volumetric feed pump the speed of which is coupled to the speed of the homogenization pump.

Figure 1:
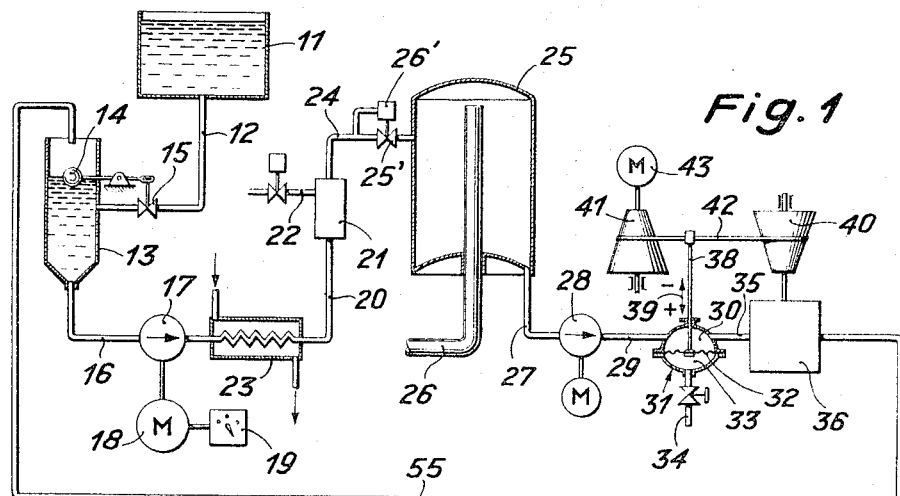

In the plant illustrated in FIG. 1, the liquid for treatment is fed from a storage tank 11 via pipe 12 to an intermediate tank 13. A float 14 is provided to control the level of the liquid and actuates the valve 15 in the pipe 12. The liquid flows from tank 13 via pipe 16 to the pump 17, which acts as a flow setting device in the form of a volumetric delivery system, e.g. a rotary piston machine, and which is driven by a motor 18 which can be set to three different speedstages by means of a speed adjusting device 19. From pump 17, the liquid flows via pipe 20 to the heating system 21 where it is mixed with live steam from pipe 22. The amount of live steam supplied is controlled conventionally according to the heating temperature required. Pipe 20 also contains a pre-heater 23 to which a suitable heating medium can be fed, for example vapor liberated as a result of the subsequent expansion of the liquid. The heated liquid then flows via pipe 24 to expansion chamber 25 in which it undergoes a rapid pressure drop. The interior of the expansion chamber is connected via pipe 26 to an injection condenser (not shown) which is connected to a vacuum pump (not shown). Pipe 24 also contains a pressure holding valve 25' which is influenced by the controller 26' to give a constant liquid pressure in the pipe 24.

It will be assumed that conditions are so arranged that the liquid is pre-heated to 75° C. in pre-heater 23 and is then heated to 150° C. by steam injection and is then immediately cooled back to 75° C. in the expansion chamber 25. Equal pre-heat and expansion temperatures theoretically ensure a constant specific gravity of the liquid before and after the treatment. Heat losses which are inevitable in practice as a result of radiation, etc., usually require an expansion temperature a few degrees C. above the pre-heat temperature so that the outflowing treated liquid has the same specific gravity as the liquid fed to the plant.

Liquid accumulating in the bottom of the expansion chamber 25 flows continuously to centrifugal pump 28 via pipe 27. If required, pipe 27 may contain a cooler to reduce the temperature of the liquid further by heat exchange. Pump 28 delivers the liquid via pipe 29 to the chamber 30 of a diaphragm sensing member 31 corresponding to the amount of liquid flowing therethrough. The chamber 30 is separated from a second chamber 33 by a diaphragm 32. An adjustable pressure can be maintained in chamber 33 via a pipe 34 and, for example, will be 1.2 kg. per. sq. cm. From chamber 30 the liquid flows via pipe 35 to a volumetric delivery device, such as, a homogenization pump 36 and then from the latter out of the plant via pipe 37. The homogenization pump 36 comprises a high-pressure piston pump which delivers the liquid at a pressure of, for instance, 150 kg. per sq. cm., to a homogenization valve (not shown) in which the liquid is homogenized as it flows through the gap-like valve cross-section.

According to the invention, the diaphragm sensing member 31 influences the amount of liquid flowing per unit of time through the volumetric homogenization pump. To this end, rod 38 is secured to diaphragm 32 and on a movement in the positive direction of the arrow 39 so adjusts the belt 42 running over the conical rollers 40 and 41 that the homogenization pump is driven at an increased speed by roller 40. A constant speed electric motor 43 is used as the driving means for the belt drive illustrated.

The flow of liquid in the pipe 37 is lead into branch pipes 44, 45 and 46, each of which contains a valve 47, 48 and 49 and leads to a racking and packing station 50, 51 and 52 respectively, in which the liquid sterilized in the plant as above described is aseptically racked in individual packs 53. Pipe 37 also contains a pressure holding valve 54 so controlled by the liquid pressure in the pipe as to keep the pressure constant.

After the place where pipe 46 branches off, pipe 37 continues to a recycle pipe 55 leading to the intermediate tank 13.

The apparatus as described operates as follows: It will be assumed that the plant will initially operate only under part-load to feed the racking machine 50. For this condition of operation the motor 18 of the pump 17 is set to the lowest speed stage by the speed adjusting device 19 to supply a flow of liquid slightly in excess of the requirements of the machine 50, for example, an excess of 5%. In the condition of equilibrium this excess quantity of liquid is returned to the inlet side of the plant via pipe 55. The excess flow ensures the supply of liquid required by the machine 50 under all conditions.

Also, in the condition of equilibrium the belt 42 remains in its particular position. If there is a temporary minor variation in the amount of liquid delivered by the pump 28, the diaphragm 32 is deflected. In the event of an increased quantity the diaphragm is deflected in the positive direction of the arrow 39 so that the speed of the homogenization pump 36 is adjusted accordingly.

If, for example, both machines 51 and 52 are then started up, motor 18 is set to maximum speed stage so that the pump 17 delivers the amount of liquid required by all three racking machines together with the small excess quantity which is again returned to the entry side via pipe 55. The characteristic of pump 28 is so selected that without there being any damming up in the pipe 27 it absorbs the flow of liquid which has suddenly risen to three times its former amount. Since the homogenization pump initially does not have an increased capacity with the initially constant speed, diaphragm 32 is deflected downwards to a considerable extent and increases the speed of the homogenization pump to three times its former value via the belt drive 40–42. Conversely, if one of the machines 50, 51 or 52 is switched off, the pump 17 which acts as a flow setting element is correspondingly set to reduced speed with a corresponding automatic adjustment of the speed of the homogenization pump.

Figure 2:
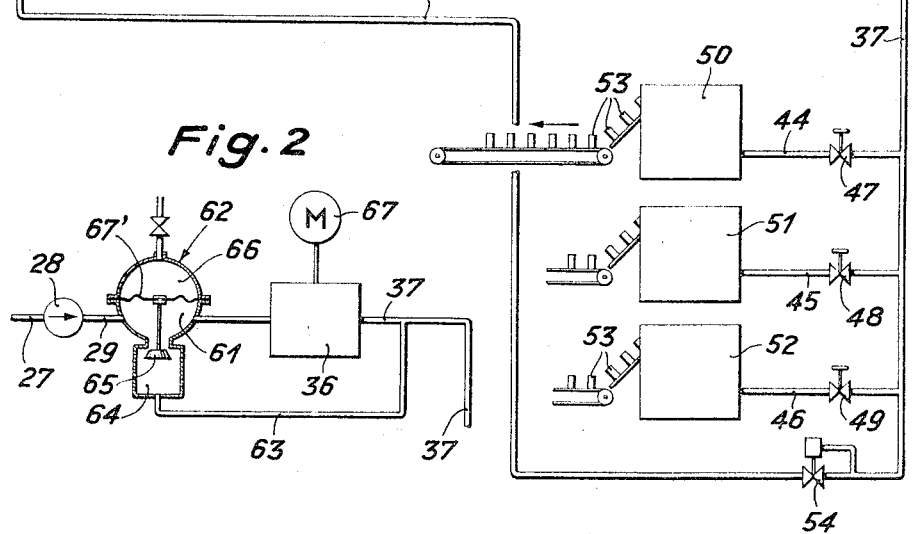
FIG. 2 shows another embodiment of the apparatus according to the invention for a plant according to FIG. 1 with a bypass pipe for the homogenization pump.

FIG. 2 shows another embodiment for influencing the amount of liquid leaving the plant through the homogenization pump. The liquid flowing to the centrifugal pump 28 via pipe 27 enters pipe 29 and the chamber 61 of a diaphragm device 62 which acts as a sensing member similarly to the device 31. A bypass pipe 63 branches from pipe 37 immediately after the homogenization pump 36 and leads to a second chamber 64 of the diaphragm sensing member 62 which is separated from chamber 61 by the valve 65. An adjustable pressure can again be maintained in a chamber 66 of the diaphragm sensing member as above described.

The homogenization pump 36 is driven by a motor 67 at a speed such that the pump continuously feeds the maximum amount of liquid. For full-load operation the sensing member 62 is so adjusted that only a small quantity of liquid, for example 5% of the amount flowing through the homogenization pump 36, is returned to the chamber 64 via the pipe 63, while for part-load operation the unused quantity of liquid is returned to the entry side of the homogenization pump 36 via pipe 63. If the amount of liquid delivered by pump 28 then increases, diaphragm 67' is deflected upwards so as to close the valve 65 with a resultant reduction of the amount of liquid returned via pipe 63.

Figure 3:
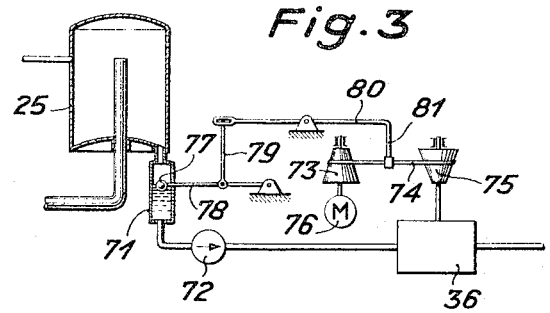
FIG. 3 shows apparatus according to the invention with a sensing element responding to the level of liquid in a level tube.

FIG. 3 shows another embodiment for the amount of liquid flowing between pressure reduction chamber 25 and homogenization pump 36. In this modification the liquid flows from chamber 25 into the level tube 71 and then via the feed pump 72 to the homogenization pump 36 which has a drive with a variable speed feature, e.g. a belt drive 73–75 similar to that shown in FIG. 1 with a motor 76 used as a drive. The level of liquid in the level tube 71 is detected by a float 77. The float movement is transmitted via linkage 78–81 to belt 74 so that in the event of a rise of the level of liquid, the speed of the homogenization pump 36 is increased, and vice versa.

In the exemplified embodiment shown in FIG. 4, the liquid for treatment flows, as in the plant shown in FIG. 1, from storage tank 91 via pipe 92 to an intermediate tank 93 which is provided with a level control system 94 and 95. From tank 93 the liquid flows via pipe 96 to a volumetric pump 97 which delivers a quantity of liquid proportional to the pump speed via pipe 98 to the heating system 99. Pipe 98 contains a pre-heater 100 similar to the pre-heater described above. The high-pressure liquid is then mixed with steam from pipe 101 in the heating system 99, the amount of steam supplied being controlled appropriately by means of a valve 102 so that the heating temperature required at any time is maintained with high accuracy. The heated liquid then flows via pipe 103 to expansion chamber 104. Pipe 102 also contains a pressure holding valve 105 which conventionally and automatically keeps the pressure in the pipe between the heater system 99 and the valve 105 constant by means of the controller 106.

Liquid flowing from the expansion chamber via the pipe 107 enters the feed pump 108, which is a centrifugal pump, and then flows via pipe 109 to the chamber 110 of a diaphragm sensing member 111 in an amount corresponding to the amount of liquid flowing through the pipes 109 and 112 of the homogenization pump 113.

Thereafter, the liquid flows from the pump 113 via a pipe 114 to the two racking and packing machines 115 and 116, where the liquid is aseptically racked into pre-sterilized containers 117. The racking machines 115 and 116 can be shut off from pipe 114 by means of suitable valves 118 and 119 in the pipeline. Pipe 114 continues beyond the racking machines as a re-cycle pipe 120 leading to the intermediate tank 93 and has a suitable pressure holding valve 120a provided therein similar to holding valve 54.

The sensing member 111 is provided with a diaphragm 121 which separates the respective chambers 110, 124 and which actuates a valve 122 through a rod secured thereto for controlling the passage of liquid from the exit side of the pump 113 back to pipe 112 via pipe 123. A suitable pressure, e.g. 1.2 kg. per sq. cm., can be maintained in the chamber 124 above the diaphragm 121.

According to the invention, the pump 97 and the homogenization pump 113 are coupled together in respect of speed. To this end, a common electric motor 131 is provided which drives both pumps at the same speed via a common shaft 132. In addition, a hand wheel 133 can be incorporated in the motor 131 to act on a brush adjusting system or control an infinitely variable transmission incorporated in the motor.

When the apparatus of FIG. 4 as described is in operation, it will be assumed by way of example that initially only the racking machine 115 receives liquid. To this end, the hand wheel 133 is used to adjust the speed of the motor 131 to a value such that the pumps 97 and 113 deliver slightly more liquid than that required by the machine 115. The excess liquid, e.g. 5% of the delivery of a pump, then flows back to the inlet side of the plant via pipe 120. This arrangement ensures that machine 115 receives sufficient liquid in all conditions.

If the second racking machine 116 is then started, the speed of the drive shaft 132 of the motor 131 is increased correspondingly at the hand wheel 133. In many cases a small deviation between the deliveries of the two pumps 97 and 113 will be inevitable or else it will be necessary to compensate flow variations due to deposits inside the liquid paths or due to other factors; in this case the bypass pipe 123 is used to compensate for such a deviation. Thus, a small quantity of liquid is continuously returned to pipe 112 from pipe 114 through the by-pass pipe 123 in the condition of equilibrium. If the amount of liquid arriving from pipe 109 slightly exceeds the capacity of the homogenization pump 113, valve 122 performs a closing movement so that the proportion of recycled liquid is reduced. Pump 113 can then absorb from pipe 109 an extra amount of liquid corresponding to that amount. Conversely, an opening movement of the valve 122 occurs in the event of a slightly reduced supply of liquid from pipe 109 as compared with the speed.

The invention is not limited to the exemplified embodiments described. For example, other devices could be used to adjust the amount of liquid flowing through the pipes 16 and 20 per unit of time; for instance, a centrifugal pump and a pressure holding device can be provided in the feed pipe to keep the pressure constant in the event of a varying liquid flow. The flow required at any time can be very accurately adjusted by means of a restrictor. It would also be possible to use different drives with a variable speed for the homogenization pump or for a volumetric pump used for flow control, for example a drive motor having adjustable brushes or a hydrostatic drive. The pumps 97 and 113 in the exemplified embodiment shown in FIG. 4 could also be coupled in respect to speed by an electrical synchronism system which employs electric circuitry to ensure that the driving motors of both pumps have the same speeds.

If the liquid for treatment does not require homogenization, then the high-pressure piston pump can of course be replaced by another volumetric delivery device in the flow path following the pressure reduction, e.g. a rotary piston pump, which would not have to deliver at a high pressure; in some cases it would even be possible to construct it as a metering device which operates with practically no delivery pressure.

Having thus described the invention, it is not intended that it be so limited as changes may be readily made therein without departing from the scope of the invention. Accordingly, it is intended that the subject matter desscribed above and shown in the drawings be interpreted as illustrative and not in a limiting sense.

What is claimed is:

1. A liquid sterilization treatment plant comprising
   a fluid supply source,
   pipe means for conducting a flow of liquid from said fluid supply source,
   a heating system interconnected with said pipe means downstream of said fluid supply source for injecting steam into said pipe means at an intermediate point thereof for heating the flow of liquid therein,
   a pressure reduction means at the end of said pipe means for cooling the heated flow of liquid from said pipe means,
   a volumetric delivery device for conducting the cooled liquid to a racking station,
   a liquid path means interconnecting said pressure reduction means and said volumetric delivery device for conducting a cooled flow of liquid therebetween,
   means operatively connected to said volumetric delivery device for controlling the output flow of liquid of said volumetric delivery device,
   said means including a sensing means interposed in said liquid path means for regulating the output of said volumetric delivery device in response to the flow of liquid in said liquid path means and an adjustable flow setting device interposed in said pipe means upstream of said heating system for adjusting the flow of liquid into said pipe means in relation to the capacity of a racking station.

2. A liquid sterilization treatment plant as set forth in claim 1 wherein said means is also connected to said flow setting device for regulating the speed of said flow setting device in relation to the speed of said volumetric delivery device.

3. A liquid sterilization treatment plant as set forth in claim 2 wherein said means includes a common adjustment for regulating the speeds of said flow setting device and volumetric delivery device.

4. A liquid sterilization treatment plant comprising
   a fluid supply source,
   pipe means for conducting a flow of liquid from said fluid supply source,
   a heating system interconnected with said pipe means downstream of said fluid supply source for injecting steam into said pipe means at an intermediate point thereof for heating the flow of liquid therein,
   a pressure reduction means at the end of said pipe means for cooling the heated flow of liquid from said pipe means,
   a homogenization pump for conducting the cooled liquid to a racking station,
   a liquid path means interconnecting said pressure reduction means and said homogenization pump for conducting a cooled flow of liquid therebetween,
   means operatively connected to said pump for controlling the output flow of liquid of said pump,
   said means including a sensing means interposed in said liquid path means for regulating the output of said pump in response to the flow of liquid in said liquid path means.

5. A liquid sterilization treatment plant as set forth in claim 4 which further comprises a centrifugal feed pump means interposed in said liquid path means for delivering the entire flow of liquid from said pressure reduction means to said homogenization pump, said feed pump having a cross-section larger than the cross-section of the maximum flow of liquid therethrough.

6. A liquid sterilization treatment plant as set forth in claim 4 wherein said means includes a variable speed drive means and said sensing means includes
   a first chamber for conducting fluid from said pressure reduction means therethrough,
   a second chamber for maintaining a constant pressure therein,
   a flexible diaphragm separating said first and second chambers for movement in response to a variation in pressure differential between said first and second chambers, and
   a rod connected to said flexible diaphragm and said drive means for varying the speed of said drive means upon movement of said flexible diaphragm.

7. A liquid sterilization treatment plant as set forth in claim 4 wherein said means includes a variable speed drive means and said sensing means includes
   a level tube depending from said pressure reduction means in said liquid path means,
   a float in said level tube for detecting the level of fluid therein, and
   means connected to said float and said drive means for varying the speed of said drive means upon variation of the level of fluid in said level tube.

8. A liquid sterilization treatment plant as set forth in claim 4 said means includes a constant speed drive means and said sensing means includes
   a first chamber for conducting fluid from said pressure reduction means therethrough,
   a second chamber for maintaining a constant pressure therein,
   a third chamber in communication with said first chamber,
   a flexible diaphragm separating said first and second chambers for movement in response to a variation in pressure differential between said first and second chambers,
   a valve connected to said flexible diaphragm for movement therewith, said valve extending into said third chamber for closing said third chamber from said first chamber upon an increase of pressure in said first chamber, and
   a bypass means communicating with said third chamber and the output end of said homogenization pump for circulation of an excess flow of liquid from said homogenization pump to said third chamber.

9. A liquid sterilization treatment plant as set forth in claim 4 which further comprises a recycle pipe means connected to said homogenization pump for recycling excess flow of liquid therefrom to said supply source.

References Cited

UNITED STATES PATENTS

| 1,765,550 | 6/1930 | VanTuyl | 165—66 X |
| 3,150,713 | 9/1964 | Loliger | 165—66 X |
| 3,202,208 | 8/1965 | Geiringer | 165—40 X |
| 3,251,405 | 5/1966 | Hallstrom | 165—40 |

FOREIGN PATENTS

| 602,766 | 8/1960 | Canada. |

EDWARD J. MICHAEL, *Primary Examiner.*

ROBERT A. O'LEARY, *Examiner.*

M. A. ANTONAKAS, *Assistant Examiner.*